United States Patent [19]

Dwyer et al.

[11] Patent Number: 5,053,202
[45] Date of Patent: Oct. 1, 1991

[54] STATIC MIXER CONFIGURATION

[75] Inventors: William P. Dwyer, Meriden; Thomas P. Patrosh, Wallingford, both of Conn.

[73] Assignee: Olin Corporation, Cheshire, Conn.

[21] Appl. No.: 562,495

[22] Filed: Aug. 2, 1990

[51] Int. Cl.[5] .............................................. C08F 2/00
[52] U.S. Cl. ................................... 422/135; 366/336; 366/337; 366/338; 366/339; 422/133; 422/224; 422/229; 425/4 R; 425/4 C
[58] Field of Search ............... 422/224, 229, 133, 135; 366/336–339; 425/4 R, 4 C

[56] References Cited

U.S. PATENT DOCUMENTS

| 3,286,992 | 11/1966 | Armeniades et al. | 259/4 |
|---|---|---|---|
| 3,297,305 | 1/1967 | Walden | 366/338 |
| 3,451,786 | 6/1969 | Perrin | 422/133 |
| 3,635,444 | 1/1972 | Potter | 259/4 |
| 3,664,638 | 5/1972 | Grout et al. | 366/338 |
| 3,704,006 | 11/1972 | Grout et al. | 259/4 |
| 3,751,377 | 8/1973 | Buckner | 425/4 R |
| 3,775,063 | 11/1973 | Grout et al. | 23/283 |
| 3,806,097 | 4/1974 | Devellian et al. | 259/4 |
| 3,827,676 | 8/1974 | Brasie | 366/337 |
| 3,860,217 | 1/1975 | Grout | 259/4 |
| 3,861,652 | 1/1975 | Clark et al. | 366/336 |
| 3,917,811 | 11/1975 | Grout et al. | 423/659 |
| 3,953,002 | 4/1976 | England, Jr. et al. | 366/339 |
| 4,003,554 | 1/1977 | Chauffoureaux | 259/4 |
| 4,074,363 | 2/1978 | Croft | 366/138 |
| 4,093,188 | 6/1978 | Horner | 366/336 |
| 4,179,222 | 12/1979 | Strom et al. | 422/224 |
| 4,185,025 | 1/1980 | Carduck et al. | 422/224 |
| 4,204,977 | 5/1980 | Zwirlein | 422/133 |
| 4,350,803 | 9/1982 | Penn | 528/10 |
| 4,408,893 | 10/1983 | Rice, III | 366/339 |
| 4,466,741 | 8/1984 | Kojima | 366/339 |
| 4,538,920 | 9/1985 | Drake | 366/177 |
| 4,641,705 | 2/1987 | Gorman | 165/85 |
| 4,747,697 | 5/1988 | Kojima | 366/339 |
| 4,753,535 | 6/1988 | King | 366/337 |
| 4,753,536 | 6/1988 | Spehar et al. | 366/339 |
| 4,767,026 | 8/1988 | Keller et al. | 222/137 |
| 4,776,704 | 10/1988 | Kopunek et al. | 366/184 |
| 4,840,493 | 6/1989 | Horner | 366/339 |
| 4,850,705 | 7/1989 | Horner | 366/339 |

FOREIGN PATENT DOCUMENTS 2076681 12/1981 United Kingdom .

Primary Examiner—Robert J. Warden
Assistant Examiner—Timothy M. McMahon
Attorney, Agent, or Firm—Ralph D'Alessandro

[57] ABSTRACT

An improved static mixer for use in a plural component dispensing apparatus is disclosed having a spacer intermediate a plurality of mixing elements to enhance the mixing and blending of the plural components. The static mixer may employ an air assist to increase the mixing energy within static mixer.

18 Claims, 3 Drawing Sheets

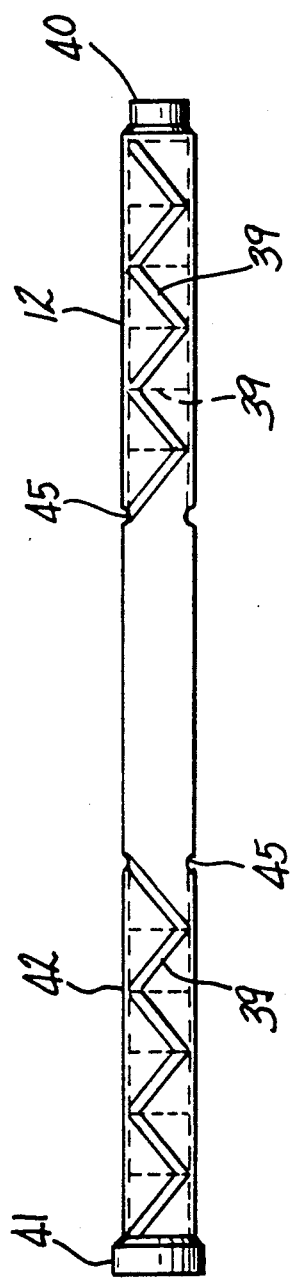
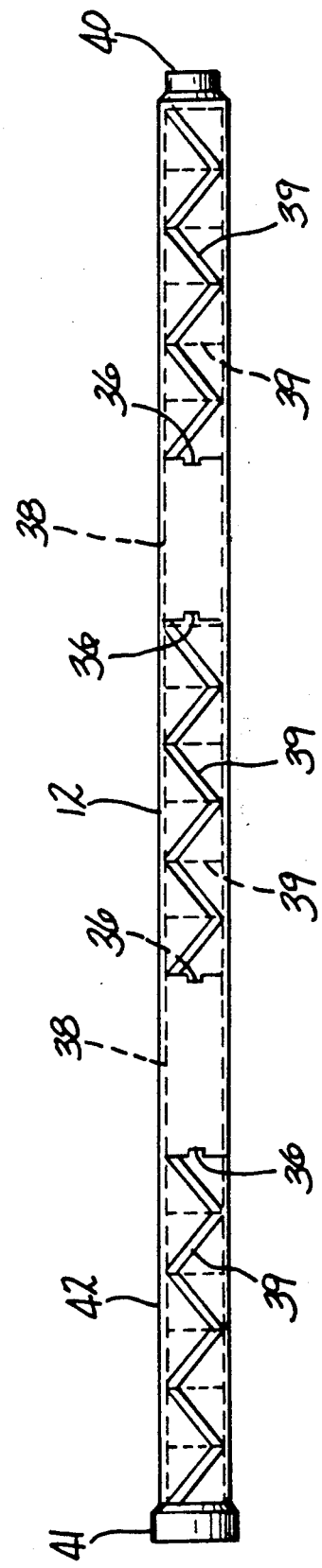
FIG-4
FIG-5

STATIC MIXER CONFIGURATION

BACKGROUND OF THE INVENTION

The present invention relates generally to apparatus used to dispense a plurality of liquids through a single orifice, and more particularly it relates to a static mixer used to enhance the mix quality of polyurethane foam from a foam dispenser utilized without the need for solvent cleaning.

Polyurethane foams are formed by the reaction of an isocyanate component and hydroxyl-bearing compounds. When mixed in the presence of a catalyst, a surfactant, and a blowing agent, these chemicals react to form cellular cross-linked polymer chains, more commonly known as a polyurethane foam. Each of these components of the plural component material, by itself, is generally stable. Thus, each component will not cure or cross-link for extended periods of time, often as long as several months, if they are properly stored. However, when the isocyanate component and the polyol component, a preformulated compound that includes a surfactant, a catalyst and a blowing agent, are mixed together in proper proportions, an exothermic chemical reaction of the isocyanate and polyol occurs. This reaction causes a continued expansion that is evidence of the polymerization and manifests itself as foam which cross-links and cures. The cross-linking and curing usually is substantially completed in a matter of seconds.

Polyurethane foam dispensers are well known and have achieved a high degree of usage in insulating or packaging applications. Their use is particularly widespread in the boat manufacturing industry where foam is used to enhance the buoyancy of the watercraft. This type of a manufacturing application requires a low density foam that can be dispensed by apparatus in a potentially combustible or explosive environment. One of the problems with foam dispensing equipment used in the marine industry involves the need to obtain a fully expanded low density foam that has not lost some of its fluorocarbons.

Prior foam dispensing apparatus has employed static mixer attachments made from either metal or plastic, such as by injection molding, that use alternating left and right handed helically-curved baffles to intermix a plurality of fluids. Representative apparatus of this type utilized to mix and blend polymeric fluids include those shown in U.S. Pat. Nos. 3,953,002; 4,408,493; 4,840,493; and 4,850,750. Two banks of stationary non-helical baffle plates arranged around an axis parallel to the overall direction of fluid flow have been used to accomplish the desired mixing and blending, as shown in U.S. Pat. No. 4,093,188. However, these devices do not always yield the desired low density foam needed for marine applications.

These problems are solved in the design of the present invention by providing an improved static mixer design in a plural component dispensing apparatus having a plurality of serially arranged oppositely handed baffle members within a tubular housing with an intermediate spacer portion where the baffle members are interrupted to form a substantially planar connecting portion. The intermediate spacer portion separates the baffle members into two separate mixer sections.

SUMMARY OF THE INVENTION

It is an object of the present invention to provide an improved static mixer configuration to obtain the desired low density free-rise non-chlorinated fluorocarbon urethane foam.

It is another object of the present invention to provide an improved static mixer configuration to obtain a desired low density urethane foam without the loss of fluorocarbons.

It is a feature of the present invention that the improved static mixer configuration employs a generally planar spacer portion intermediate serially arranged oppositely handed baffle members that are contained within a disposable tubular housing that is attached to a foam dispensing apparatus.

It is another feature of the present invention that the oppositely handed baffle members form at least a pair of passages within the tubular housing on the sides of the baffles.

It is still another feature of the present invention that a compressed air infeed is provided into the static mixer configuration to increase the mixing energy of the apparatus.

It is an advantage of the present invention that a low density urethane foam is obtained.

It is another advantage of the present invention that the improved static mixer configuration is low cost, simple in design and easily replaceable.

It is further advantage of the present invention that a well mixed urethane foam is obtained by the use of the improved static mixer configuration.

It is yet another advantage of the present invention that the improved static mixer design achieves the required mix and entrapment of chemical blowing agents to obtain the desired free-rise foam density with the desired color and cell structure.

It is still another advantage of the present invention that a well mixed urethane foam is obtained by the use of the improved disposable static mixer configuration in a foam dispensing assembly that does not utilize solvent for cleaning.

These and other objects, features and inventions are obtained in the improved static mixer configuration of the present invention employed in conjunction with a foam dispensing apparatus wherein a substantially planar spacer portion intermediate serially segmented oppositely handed baffles are employed in conjunction with an air assist to obtain the desired free-rise foam density and the required mix and entrapment of blowing agents.

BRIEF DESCRIPTION OF THE DRAWINGS

The advantages of this invention will become apparent upon consideration of the following detailed description of the invention, especially when it is taken in conjunction with the accompanying drawings wherein:

FIG. 4 is a side elevational view of an alternative embodiment of the improved static mixer configuration within its tubular housing having a void space or spacing gap between the mixing elements; and FIG. 5 is a side elevational view of another alternative embodiment of the improved static mixer configuration within its tubular housing having a plurality of spacer elements.

DETAILED DESCRIPTION OF THE PREFERRED EMBODIMENT

Figure 1:
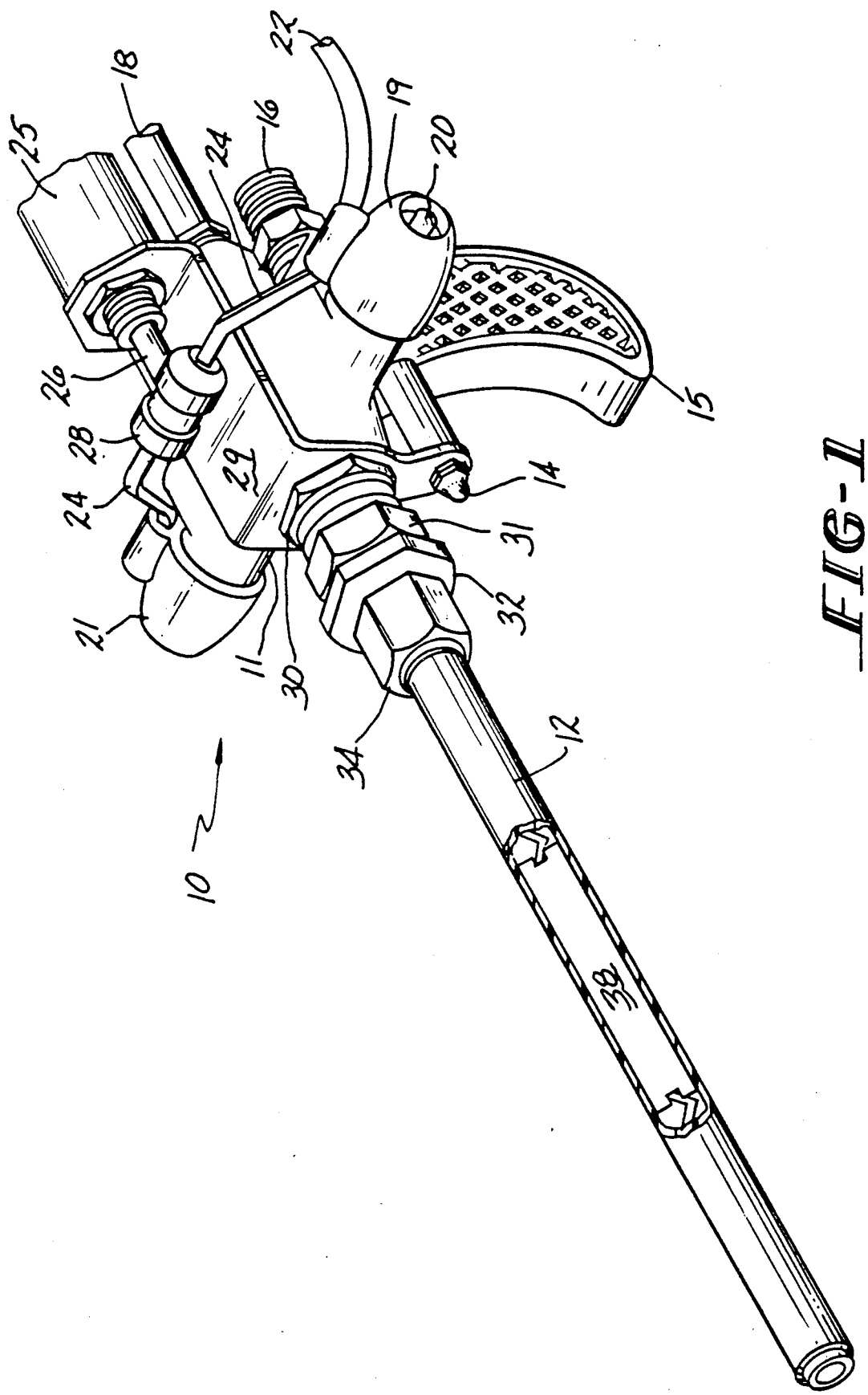
FIG. 1 is a perspective view of a foam dispensing apparatus employing the improved static mixer configuration of the present invention.

FIG. 1 shows in a top perspective view the foam dispensing apparatus, indicated generally by the numeral 10. As seen in this view, dispenser 10 has a gun manifold 11 with a static mixer 12 attached to the front of the manifold 11. A trigger 14 is shown mated to a handle 15. The isocyanate A side feed line 16 can be seen, while the polyol B side feed line is not visible. An air entry line 18 is shown entering the rear of the manifold 11. This air entry line 18 is used to feed air in through the isocyanate A side of the manifold 11 to enhance the mixing of the foam components. An isocyanate A side valve assembly 19 is shown, as is the polyol B side valve assembly 21, each containing a stem or rod 20 within the manifold 11. Each valve assembly has a metal rod 20 with a rubber tip (not shown) within the manifold 11 to control the flow of the isocyanate A side component and the polyol B side component through the internal flow passages or orifices (not shown) in the manifold 11. Only one of the metal rods 20 (the isocyanate A side metal rod 20) is shown. A power cord 22 is shown for use with the electric trigger, although it may be preferable to employ an pneumatic trigger where the dispenser 10 is used in a potentially explosive atmosphere.

An air cylinder 25 is shown attached to the manifold 11 by a mounting bracket 29 and is activated by the trigger 14. The air cylinder 25 includes a pneumatically driven cylinder rod 26 which pushingly contacts a valve arm coupling 28 that opens and closes the flow passages or orifices to control the flow of components within the manifold 11 by limited rotation of the valve arms 24 and the valve assemblies 19 and 21 to which the valve arms 24 are attached.

The static mixer 12 is connected to the manifold 11 by means of a swivel fitting that comprises a rigid portion 30 that is affixed over the mounting bracket 29 to the manifold 11. A rotational portion 31 of the swivel fitting is used to tighten the fitting with the static mixer 12 to the manifold 11. An adaptor 32 is provided which, in combination with tighten down nut 34 through which the tubular housing 42 of the static mixer 12 extends, is utilized to securely fasten the static mixer 12 to the manifold 11. The static mixer 12 is thus simply fastened to the manifold 11 so that it is easily disconnected and disposed of should the air cleaning or air purge, to be described more fully hereafter, not be fully effective and the mixer 12 become clogged.

Figure 2:
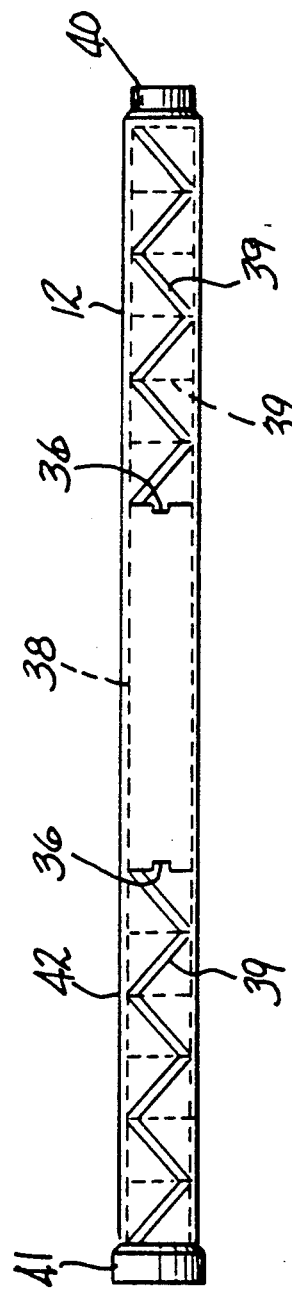
FIG. 2 is a side elevational view of the improved static mixer configuration within its tubular housing.

The static mixer 12 is best seen in FIG. 2 wherein it comprises a plurality of oppositely handed spiral segments or helical mixer elements 39.

The mixed A and B side isocyarate and polyol components, after having traveled &he length of the housing 42, exit the tubular housing 42 of the static mixer 12 through a dispensing orifice 40. The surface of the tubular housing 42 around the orifice 40 must be smooth and clean to avoid providing spaces for the buildup of foam which can eventually clog the static mixer 12. This tubular housing 42 surrounds the mixer elements 39 and the static mixer spacer 38. A base portion 41 of the static mixer 12 fits within the tighten down nut 34 of FIG. 1 so that the base portion is retained on the interior of the tighten down nut 34 and the tubular housing 42 extends therethrough.

The static mixer spacer 38 is preferably a single planar plastic sheet that is about 0.040 inches thick, but may be made more rigid by being as thick as 1/16 of an inch. This spacer 38 separates the mixer elements 39 into fore and aft sections. The spacer 38 can separate an equal number of elements 39, or can have unequal numbers on the fore and aft sections as desired and is necessary for the different foam formulations utilized. Twelve segment elements have been successfully employed on each side of the spacer 38. The spacer elements 39 are detachably fastened to the mixer spacer 38 by appropriate means, such as by interlocking spacer notches 36 and mixer element notches 37.

The length of the spacer 38 can vary with reference to the overall length of the static mixer 12. Lengths successfully employed have been about 1.5 inches and about 2.5 inches. With a 10 inch length of mixer elements 39, this gives a ratio of lengths of the spacer 38 to the mixer elements 39 of between about 0.10 to about 0.30 and, more preferably about 0.15 to about 0.25. The overall length of the static mixer 12 with its tubular housing 42 is about 13 inches. The tubular housing 42 has about a 0.5 inch inside diameter and about a 0.375 inch orifice or opening at its dispensing end.

An air assist can be employed in the mixing of the isocyanate component A and the polyol component B by being fed in through the air entry line 18 into the isocyanate A component side through a hole that may be as small as 0.015 inches in diameter in the A side port. It has been found that this compressed air, when fed at a pressure of between about 80 to about 125 pounds per square inch, and preferably at about 90 pounds per square inch, enhances the final mix of the foam and obtains the proper or desired density of the urethane foam. The air flow is about 0.37 cubic feet per minute at 90 pounds per square inch. A desired density has been about 1.8 to about 2.0 pounds per cubic foot. It is theorized that this air assist provides extra energy to improve the mixing of the isocyanate and polyol components.

This air enters the isocyanate A side component stream in the front portion of the manifold 11 of the dispenser 10. The air is fed by way of two inline valves (not shown). The first merely opens or closes the main air line. The second valve, positioned serially between the first main air line flow valve and the manifold 11, is a two position mix valve that can operate in a fully opened Position where air is blown through the isocyanate A side of the gun to assist in cleaning, or in a midway position as the air assist to enhance the mixing of the isocyanate and polyol components by imparting more energy to the isocyanate feed stream. The mix valve has about a ⅛ inch diameter opening in the ball valve to permit the purge stream of air to pass through to the manifold 11 and the static mixer 12. The opening for the air assist stream is about 0.015 inches in diameter. The compressed air source should be filtered for moisture before being connected to the dispenser 10.

Where an improper mix is obtained in the polyurethane foam, large glassy cells or colored streaks are symptomatic of an incomplete mixing of the light brown polyol and the dark brown isocyanate. The use of the improved static mixer 12 design of the present invention with the spacer 38 and the air assist has removed the problem with poor mixing. However, a change in the appearance of the foam or a reduced output of foam from the static mixer 12 may occur which indicates that the mixer 12 is clogged and should be discarded or cleaned and reused by soaking in a suitable foam stripping agent.

The air cylinder 25 operates with a cam type of system in valve assemblies 19 and 21 such that when the rod 26 is in the forward position, the flow passages or orifices within the manifold 11 are open permitting the flow of the isocyanate and polyol components therethrough. When the air flow has been cut off the spring loaded rod 26 is retracted and the orifices are closed by the rotation of the cams (not shown) within the valve assemblies 19 and 21. The interaction of the cam surfaces with the valve assemblies 19 and 21 on the A side and the B side (not shown) of the dispenser 10 causes the rubber tips of metal rods 20 to move outwardly away from the central flow passage of the manifold 11 in which is placed a stream splitter insert (not shown) to keep the isocyanate A side and polyol B side components separated until they enter the static mixer tubular housing 42 with its mixing elements 39.

It is to be understood that this type of a portable or on-site Polyurethane foam generating apparatus usually comprises two storage tanks for supplying the two inter-reactive polyurethane-forming materials which are the isocyanate and polyol components. A gas pressure supplying system is provided to pressurize these tanks to expel or force the reactants out therefrom through the feed lines to the dispenser 10. The static mixing chamber is supplied in the form of the static mixer 12 to receive the flow of the isocyanate A and the polyol B side components from the flow orifices within the manifold 11. A typical foam dispenser corresponding to dispenser 10 is shown and described in U.S. Pat. No. 4,073,664, specifically incorporated by reference hereafter in pertinent part in so far as it is consistent with the present invention and utilizing minor modifications, such as the manifold insert and a passageway to permit the air assist and purging air stream to enter the isocyanate A component side flow passage.

The mixing elements 39 may be of any suitable serially segmented type, such as that described in U.S. Pat. No. 4,850,705.

Figure 3:
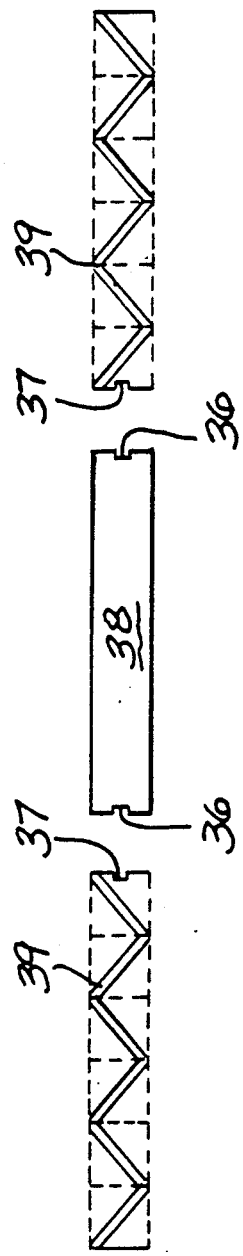
FIG. 3 is an exploded side elevational view of the improved static mixer configuration of FIG. 2 without the tubular housing.

FIG. 4 shows an alternative embodiment of the static mixer 12 employing a void space or spacing gap 44 between the mixing elements 39. The elements 39 are maintained in position by suitable retaining devices, such as crimps 45 in the tubular housing 42. The length of the void space or spacing gap 44 can be the same as the length of the spacer 38 seen in FIG. 2, or longer or shorter as desired. The space 44 serves the same purpose as the spacer 38, but does not separate the foam being mixed and blended by the mixer elements 39 as does the solid mixer spacer 38 of FIGS. 1-3. A plurality of spaces 44 could also be employed within the housing 42 similar to the design shown in FIG. 5.

FIG. 5 shows a second alternative embodiment of the static mixer 12 employing a plurality of mixer spacers 38 of FIG. 2 within the tubular housing 42. The actual number employed may be varied depending upon the desired length of the tubular housing and the number of segmented mixer elements 39 employed.

In operation, the dispenser 10 is activated by depression of the trigger switch 14 which allows air to activate the air cylinder 25 and force the cylinder rod 26 forward to the open position by rotating the cams within the valve assemblies 19 and 21 to push the rubber tipped stems of the isocyanate A component and the polyol B component valve assemblies 19 and 21 outwardly to permit the flow of the isocyanate and polyol components through their respective feed lines into the manifold 11. The flow streams of the isocyanate A and the polyol B components are kept separate until routed into the static mixer 12 at the front of the manifold 11. An air assist feed stream is fed in through the air entry line 18 into the isocyanate A component side port to enhance the mixing of the isocyanate and polyol components.

The isocyanate A and the polyol B components are fed under pressure into the static mixer tube and swirl about the stationary mixing elements 39, with the assistance of the air feed, to obtain a proper blending and mix. When the components reach the static mixer 12 the generally planar mixer spacer 38 permits the foam to expand for the finite short distance it must travel toward the orifice 40 without further rotational guidance from the mixer elements 39. This short span of travel of the foam components in their partially mixed state continues until the foam comes into contact with the serially segmented mixer elements 39 which again commence the oppositely handed spiral or helical rotation about the mixer elements 39 toward the orifice 40. The fully mixed and blended polyurethane foam then exits the dispenser apparatus 10 through the orifice 40.

While the invention has been described above with the references to specific embodiments thereof, it is apparent that many changes, modifications and variations in the materials, arrangement of parts and steps can be made without departing from the inventive concept disclosed herein. For example, the generally planar mixer spacer 38 may be formed with a plurality of holes in it when constructed of a sufficiently rigid material to withstand the mixing pressure and not collapse. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety in pertinent part.

Having thus described the invention, what is claimed is:

1. A static mixer adapted for use with a plural component dispensing apparatus for the dispensing of a substance formed for the mixing and reaction of plural components that are fed into a housing with a predetermined cross section at a first upstream end and exit the housing at an opposing second downstream end, comprising:
   (a) a plurality of continuous helical mixer element within the housing between the first end and opposing second end, the mixer elements extending a first length within the housing; and
   (b) a flat elongated planar spacer extending a second length and across substantially the entire cross section of the housing disposed intermediate at least one pair of the continuous plurality of mixer elements, downstream of the first of the pair of elements and upstream of the second of the pair of elements, the ratio of the second length of the spacer to the first length of the mixer elements being at least about 0.10 to about 0.30.

2. The static mixer according to claim 1 wherein the ratio of the length of the spacer to the plurality of mixer elements is from about 0.15 to about 0.25.

3. The static mixer according to claim 1 wherein a plurality of spacers are employed intermediate the plurality of mixer elements.

4. The static mixer according to claim 1 wherein the flat elongated planar spacer has a plurality of openings therein.

5. The static mixer according to claim 1 wherein each of the mixer elements comprises a series of a plurality of adjacent segmented helical elements.

6. The static mixer according to claim 5 wherein the plurality of mixer elements are detachably fastened to the spacer.

7. The static mixer according to claim 6 wherein the plurality of mixer elements are detachably fastened to the spacer by interlocking notches.

8. In a plural component dispensing apparatus for the dispensing of a foam formed from the mixing and reaction of an isocyanate component delivered through an isocyanate feed line and a polyol component delivered through a polyol feed line, the isocyanate and polyol components being fed in through a first end of a static mixer to form a stream which is mixed and reacted therein to form the foam which is dispensed from an opposing second end of the static mixer, the improvement comprising:

a flat elongated planar spacer in the static mixer disposed intermediate at least one pair of a plurality of helical mixer elements of a first length between the first end and the opposing second end within a housing having a predetermined cross section the elongated planar spacer being downstream of the first of the pair of elements and upstream of the second of the pair of elements and extending across substantially the entire cross section and having a second length such that the ratio of the second length of the spacer to the first length of the plurality of helical mixer elements is at least about 0.10 to about 0.30.

9. The plural component dispensing apparatus according to claim 8 wherein a plurality of spacers are employed intermediate the plurality of mixer elements.

10. The plural component dispensing apparatus according to claim 8 wherein the spacer comprises a gap spacing within the housing.

11. The plural component dispensing apparatus according to claim 8 further comprising means for feeding an air feed stream into the housing of the static mixer concurrently with isocyanate and polyol components to enhance mixing of the components.

12. The plural component dispensing apparatus according to claim 11 further comprising means for feeding the air feed stream into the housing with the isocyanate component.

13. The plural component dispensing apparatus according to claim 8 wherein the generally planar and elongated spacer has a plurality of openings therein.

14. The plural component dispensing apparatus according to claim 13 wherein the plurality of spacers comprise a plurality of gap spacings within the housing.

15. The plural component dispensing apparatus according to claim 8 wherein each of the mixer elements comprise a series of a plurality of adjacent segmented elements.

16. The plural component dispensing apparatus according to claim 15 wherein the plurality of mixer elements are detachably fastened to the spacer.

17. The plural component dispensing apparatus according to claim 16 wherein the plurality of mixer elements are detachably fastened to the spacer by interlocking notches.

18. The plural component dispensing apparatus according to claim 17 wherein the ratio of the length of the spacer to the plurality of mixer elements is from about 0.15 to about 0.25.

* * * * *